(12) United States Patent
Coonrod

(10) Patent No.: US 10,862,894 B2
(45) Date of Patent: Dec. 8, 2020

(54) DECENTRALIZED ACCESS CONTROL FOR AUTHORIZED MODIFICATIONS OF DATA USING A CRYPTOGRAPHIC HASH

(71) Applicant: FogChain Inc., San Carlos, CA (US)

(72) Inventor: Nathanael Phillip Coonrod, Gilbert, AZ (US)

(73) Assignee: Fogchain Inc., San Carlos, CA (US)

( * ) Notice: Subject to any disclaimer, the term of this patent is extended or adjusted under 35 U.S.C. 154(b) by 204 days.

(21) Appl. No.: 16/005,272

(22) Filed: Jun. 11, 2018

(65) Prior Publication Data

US 2019/0379673 A1 Dec. 12, 2019

(51) Int. Cl.
*H04L 29/06* (2006.01)
*G06F 21/60* (2013.01)

(52) U.S. Cl.
CPC .......... *H04L 63/104* (2013.01); *G06F 21/602* (2013.01)

(58) Field of Classification Search
None
See application file for complete search history.

(56) References Cited

U.S. PATENT DOCUMENTS

| | | | | |
|---|---|---|---|---|
| 10,095,888 | B1* | 10/2018 | Lee | G06F 21/64 |
| 10,338,913 | B2* | 7/2019 | Franchitti | G06F 8/65 |
| 10,506,031 | B1* | 12/2019 | Cheng | H04L 43/0876 |
| 2013/0159744 | A1* | 6/2013 | Gooding | G06F 1/3234 |
| | | | | 713/320 |
| 2013/0160003 | A1* | 6/2013 | Mann | G06F 9/5088 |
| | | | | 718/1 |
| 2015/0370604 | A1* | 12/2015 | Miwa | G06F 9/5083 |
| | | | | 718/104 |
| 2016/0253224 | A1* | 9/2016 | Maclinovsky | G06F 9/50 |
| | | | | 719/318 |
| 2017/0123856 | A1* | 5/2017 | Baptist | G06F 9/5061 |
| 2018/0025166 | A1* | 1/2018 | Daniel | G06Q 10/06 |
| | | | | 713/189 |
| 2019/0251187 | A1* | 8/2019 | Lin | H04L 9/3239 |
| 2019/0306232 | A1* | 10/2019 | Brock | H04L 9/0643 |
| 2019/0349190 | A1* | 11/2019 | Smith | H04L 41/12 |
| 2019/0349254 | A1* | 11/2019 | Nolan | H04L 41/12 |
| 2019/0349261 | A1* | 11/2019 | Smith | H04L 41/12 |
| 2019/0349426 | A1* | 11/2019 | Smith | H04W 4/08 |
| 2019/0349733 | A1* | 11/2019 | Nolan | H04L 41/0806 |
| 2019/0354518 | A1* | 11/2019 | Zochowski | G06F 16/2379 |

\* cited by examiner

*Primary Examiner* — Kambiz Zand
*Assistant Examiner* — Arezoo Sherkat
(74) *Attorney, Agent, or Firm* — Knobbe, Martens, Olson & Bear, LLP

(57) ABSTRACT

Embodiments of network devices for access control are described. In some embodiments, an access control processor of a first node receives a request from a requestor node on an unsecure network to join a first group of nodes on a secure network, where the first node coordinates network activities of the first group of nodes including a plurality of partitioned nodes of a network. In response to receiving the request, the access control processor assigns the requestor node to a first pool of the first group of nodes that are configured to perform authorized modifications of data including a cryptographic hash to protect the data against unauthorized modifications. In some embodiments, the access control processor initiates the authorized modifications of the data using one or more nodes assigned to the first pool and one or more nodes of a second pool of the first group of nodes.

27 Claims, 10 Drawing Sheets

US 10,862,894 B2

DECENTRALIZED ACCESS CONTROL FOR AUTHORIZED MODIFICATIONS OF DATA USING A CRYPTOGRAPHIC HASH

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Technical Field

The present disclosure relates to data access control, and more particularly, to authorized modifications of data based on the data access control.

Description of the Related Art

Technological advances in blockchain technology and other distributed ledger technology have allowed for digital information to be securely distributed using secured cryptography. As blockchain technology continues to improve, transactions and other data modifications can occur more securely and quickly across millions of users. Blockchain technology strives to allow the data to be transparent and incorruptible without a singular point of failure or a centralized single controlling entity. However, because existing blockchain technology can be made up of a network of decentralized computing nodes, existing technology suffers from lack of scalability and performance. Embodiments of systems and methods disclosed herein overcome these problems.

BRIEF DESCRIPTION OF THE DRAWINGS

The innovations described in the claims each have several aspects, no single one of which is solely responsible for its desirable attributes. Without limiting the scope of the claims, some prominent features of this disclosure will now be briefly described.

SUMMARY

Figure 1:
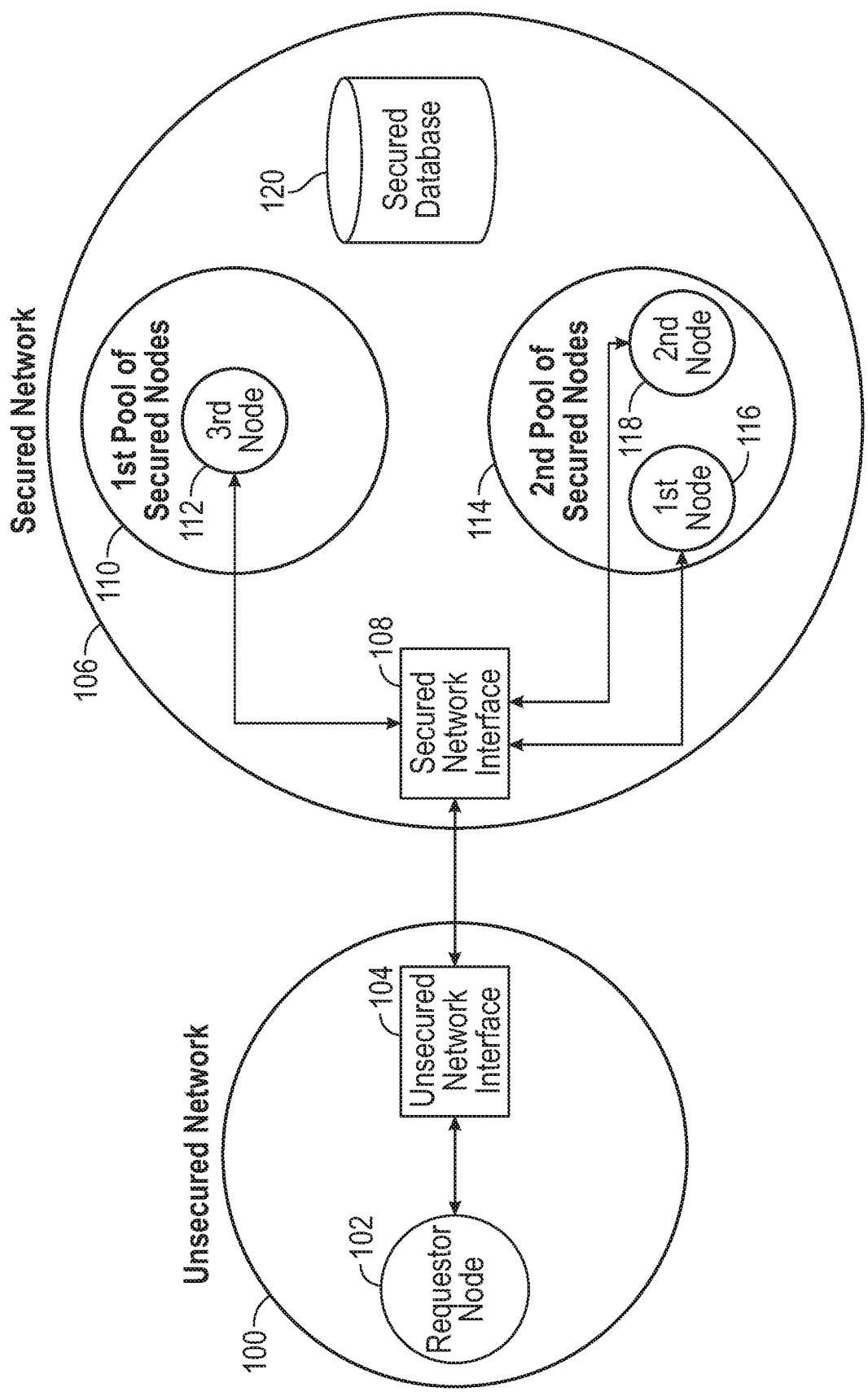
FIG. 1 is a block diagram illustrating an unsecured and secured network infrastructure according to some embodiments of the present disclosure.

Some embodiments include an access control method comprising, by at least one processor of a first node: via a network interface, receiving a request packet from a requester node on an unsecured network to join a first group of nodes, the first node configured to monitor data shared in the first group of nodes comprising a plurality of partitioned nodes of a secured network; in response to the received request, assigning the requester node to a first pool of the first group of nodes within the secured network using a secured network protocol through the network interface, wherein one or more nodes of the first pool are configured to perform one or more authorized modifications of data, the data comprising a blockchain including at least one cryptographic hash configured to protect the data against unauthorized modifications; initiating the one or more authorized modifications of the data using one or more nodes assigned to the first pool including the requestor node and one or more nodes of a second pool of the first group of nodes, wherein the one or more nodes of the second pool are different than the one or more nodes of the first pool, and wherein the one or more nodes of the first pool and second pool are configured to perform additional authorized modifications of the data; determining performance of the requester node, the performance indicative of a level of protection of data from malicious destruction as a result of at least one authorized modification of the data by the requester node; and in response to determining that the performance of the requester node satisfies a threshold, reassigning the requester node to the second pool.

The method of any of the preceding paragraphs can further comprise, by the at least one processor of the first node: receiving a performance characteristic based on performed modifications of the data for the requestor node assigned to the first group of nodes; determining that the performance characteristic for the requestor node satisfies a first threshold; and assigning the requestor node from the first pool to the second pool.

The method of any of the preceding paragraphs can further comprise: receiving a performance characteristic for subsequent modifications of the data for the requestor node; determining that the performance characteristic for the requestor node satisfies a second threshold; and assigning the requestor node from the second pool to the first pool.

Some embodiments include an access control method comprising, by at least one processor of a first node: receiving a request from a requestor node to join a first group of nodes, the first node coordinating network activities of the first group of nodes comprising a plurality of partitioned nodes of a network; in response to receiving the request, assigning the requestor node to a first pool of the first group of nodes, wherein one or more nodes of the first pool are configured to perform computations for a blockchain without receiving blockchain tokens for the performed computations; initiating computations for the blockchain using one or more nodes assigned to the first pool and a second pool of the first group of nodes, wherein the second pool includes one or more different nodes than the first pool; and initiating distribution of tokens to the one or more nodes assigned to the second pool of the first group of nodes based on the performed computations for the blockchain.

The method of any of the preceding paragraphs can further comprise, by the at least one processor of the first node: receiving a performance characteristic based on performed blockchain computations for the requestor node assigned to the first group of nodes; determining that the performance characteristic for the requestor node satisfies a first threshold; and assigning the requestor node from the first pool to the second pool.

The method of any of the preceding paragraphs can further comprise: receiving a performance characteristic for subsequent computations for the blockchain for the requestor node; determining that the performance characteristic for the requestor node satisfies a second threshold; and assigning the requestor node from the second pool to the first pool.

In the method of any of the preceding paragraphs, the first threshold can be pre-determined.

In the method of any of the preceding paragraphs, the first threshold can be based on a performance characteristic of other nodes in the first group of nodes.

In the method of any of the preceding paragraphs, to assign the requestor node from the first pool to the second pool can include replacing a node in the second pool with the requestor node.

The method of any of the preceding paragraphs can further comprise, by the at least one processor of the first node: receiving a performance characteristic for a plurality of nodes of the first group of nodes, including the requestor node, associated with the performed computations for the blockchain; and based on the received performance characteristic, assigning the requestor node as a block hash node for the first group of nodes, wherein the block hash node is configured to generate a block hash for the blockchain.

The method of any of the preceding paragraphs can further comprise, by the at least one processor of the first node: receiving a generated block hash for the blockchain from the block hash node, wherein initiating computations for the blockchain include initiating computations for the generated block hash.

The method of any of the preceding paragraphs can further comprise, by the at least one processor of the first node: determining that a predetermined time period elapsed; and in response to determining that the predetermined time period elapsed, assign a different node of the first group of nodes as the block hash node.

The method of any of the preceding paragraphs can further comprise, by the at least one processor of the first node: assessing network traffic for the first group of nodes; determining that the network traffic for the first group of nodes satisfies a threshold; in response to determining that the network traffic for the first group of nodes satisfies the threshold, repartitioning the first group of nodes into a first subset of nodes and a second subset of nodes; assigning the first subset of nodes to the first group of nodes; assigning the second subset of node to a second group of nodes; and assigning a node of the second subset of nodes to manage activities for the second group of nodes.

The method of any of the preceding paragraphs can further comprise, by the at least one processor of the first node: determining that a predetermined time period elapsed before receiving results of the computation from a node in the second pool; assigning a node on the first pool to perform the computation for the blockchain; and updating a performance characteristic for the node in the second pool and the node on the first pool.

The method of any of the preceding paragraphs can further comprise, by the at least one processor of the first node: determining that a computation for the blockchain is to be performed across one or more nodes of the first group of nodes and one or more nodes of a second group of nodes; connecting with a second node of the second group of nodes coordinating activities of the second group of nodes by sharing information related to the computation for the blockchain; and initiating the computation for the blockchain across the first and second group of nodes.

The method of any of the preceding paragraphs can further comprise, by the at least one processor of the first node: assigning the first node to a second group of nodes, wherein the first node is configured to manage activities for the first group of nodes and for the second group of nodes.

In the method of any of the preceding paragraphs, the computations for the blockchain can include verifying one or more transactions or blocks of the blockchain.

Some embodiments include an access control system comprising: a first node including at least one processor, the at least one processor configured to: receive a request from a requestor node to join a first group of nodes, the first node coordinating network activities of the first group of nodes comprising a plurality of partitioned nodes of a network; in response to receiving the request, assign the requestor node to a first pool of the first group of nodes, wherein one or more nodes of the first pool are configured to perform computations for a blockchain without receiving blockchain tokens for the performed computations; initiate computations for the blockchain using one or more nodes assigned to the first pool and a second pool of the first group of nodes, wherein the second pool includes one or more different nodes than the first pool; and initiate distribution of tokens to the one or more nodes assigned to the second pool of the first group of nodes based on the performed computations for the blockchain.

In the system of any of the preceding paragraphs, the at least one processor can be further configured to: receive a performance characteristic based on performed blockchain computations for the requestor node assigned to the first group of nodes; determine that the performance characteristic for the requestor node satisfies a first threshold; and assign the requestor node from the first pool to the second pool.

In the system of any of the preceding paragraphs, the at least one processor can be further configured to: receive a performance characteristic for subsequent computations for the blockchain for the requestor node; determine that the performance characteristic for the requestor node satisfies a second threshold; and assign the requestor node from the second pool to the first pool.

In the system of any of the preceding paragraphs, the first threshold can be pre-determined.

In the system of any of the preceding paragraphs, the first threshold can be based on a performance characteristic of other nodes in the first group of nodes.

In the system of any of the preceding paragraphs, the at least one processor can be configured to assign the requestor node from the first pool to the second pool by replacing a node in the second pool with the requestor node.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

Overview

Blockchain technology can be used across various industries, such as recording events, medical records, identity management, transaction processing, documenting provenance, food traceability, and voting. Blockchain technology can use a single blockchain that is processed by an entire blockchain network. However, such blockchain technology can become increasingly slow and impractical where transactions may need to be verified across a large number of nodes, causing a large delay and requiring large processing power collectively across nodes. The scalability and the ability to process data quickly is becoming one of the biggest issues facing blockchain technology. Delays associated with processing data may open the blockchain to susceptible attacks, such as a node transmitting two conflicting transactions of a blockchain at the same time. If a certain smart contract or development application on a blockchain sees or experiences an increase in traffic due to increase in token usage or smart contract usage, this can slow down the entire blockchain network. Moreover, nodes running on other blockchain networks can have anonymous users who could tamper with or attack the blockchain network in a variety of ways.

Embodiments of this disclosure relate to technical solutions that can alleviate the delay and reduce the processing power requirements for verifying transactions of a blockchain. Some embodiments of systems and methods described herein improve blockchain technology by creating a blockchain that performs certain actions based on a node's network performance or computational speed. Some embodiments of the present disclosure describe placing or moving nodes into certain pools based on the nodes performance. Nodes in the one or more pools can compete against each other to be assigned or promoted to certain pools or to be assigned to certain roles.

Certain pools may be assigned to processes lower or higher priority transactions or may be designated to earn a certain number of blockchain coins. A top performing node can be assigned to a captain node. Different node roles or pools of nodes can receive varying awards (such as coins generated from every block of the blockchain) that are distributed based on the node's performance. For example, the captain node can receive the most coins for the blocks where the node is assigned to be captain.

In some embodiments, each team can perform its own blockchain computations for its own blockchain. Each team can manage its own blockchain that keeps track of accounts and its own distributed ledger. Each team can include its own secured database including data related to smart contracts, tokens, and hash maps. When a team becomes overwhelmed with traffic, new nodes can be recruited from other teams or new teams created via repartitioning of nodes from the original team. When there is less activity on the team's blockchain, the nodes of the team can be reassigned to other teams.

Advantageously, some embodiments allow for scalability and high performance of verification of transactions or other blockchain data modification. In some cases, a blockchain network can create healthy competition and encourage faster computation leading to a faster blockchain network. By splitting the network into teams or pools, the blockchain network can scale automatically as more transactions or smart contracts are submitted to the network. Furthermore, creating teams or pools can reduce network traffic, as the network traffic can be isolated to certain geographical locations or reduced to verifying transactions using nodes of one or more pools or groups or teams. Unlike other known blockchains networks, having verified users run nodes can ensure that they do not attack the network and that they are operating their nodes properly.

Alternatively or additionally, having a network that can monitor itself and improve upon itself such as by creating a blockchain that can evolve with technological innovations and that can allow any attacks that occur to be dealt with immediately and swiftly, creating a faster and safer blockchain. For example, traditional blockchain networks are plagued with scalability issues as the number of blockchain transactions increase. As the volume of transactions increase on a blockchain network, the blockchain size typically increases thereby resulting in increased computational load on each node, delayed blockchain transactions, and increased network throughput.

Some disclosed embodiments include dividing the nodes of the network into teams in which each team implements its own distributed ledger. Advantageously, the blockchain size can be smaller for each team because each team is managing a portion of the overall blockchain ledger. Transactions on the blockchain network can be assigned to a suitable team and thus, nodes of the team, which represent a subset of the total nodes of the network, can perform the computations to verify the transaction. Thus, the computational load on each node can be reduced and transactions can be processed faster and more efficiently. Moreover, since the transactions can be assigned to the suitable team, smaller blocks of data can be transmitted between the nodes of the team, which represent a subset of the total nodes of the network. Accordingly, the overall network bandwidth usage can be reduced and network resources can be used more efficiently.

In some cases, the pools of network nodes can be managed by referee nodes that manage or enforce security of the blockchain or the pool assigned to the referee node. Some embodiments describe repartitioning teams based on certain circumstances, such as processing times or processing demands meeting certain thresholds.

System Overview of Network Infrastructure

FIG. 1 is a block diagram illustrating an unsecured and secured network infrastructure according to some embodiments of the present disclosure. The unsecured network 100 of FIG. 1 includes a requestor node 102 and an unsecured network interface 104. The secured network 106 of FIG. 1 includes a first pool of secured nodes 110, a second pool of secured nodes 114, a secured database 120, and a secured network interface 108. The first pool of secured nodes 110 can include a third node 112. The second pool of secured nodes 114 can include a first node 116 and a second node 118.

In some embodiments, the network can include an unsecured network 100 and a secured network 106. The unsecured network 100 can include nodes, such as the requestor node 102, that does not have access privileges to data, such as access to modify data in the secured database 120.

The requestor node 102 can request access to the secured network 106. For example, the requestor node 102 can send a request to join a team via the unsecured network interface 104 that can communicate with a node within the secured network 106 via the secured network interface 108. A node of the secured network, such as the first node 116, the second node 118, or the third node 112, can receive the request from the requestor node 102 and assign the requestor node 102 to a pool within the secured network 106, such as the first pool 110 or the second pool 114 of secured nodes.

Any of the nodes or relays disclosed herein can include a computing device with one or more processors or attached computational devices. The computing device can be one or more of a server, edge computing device, personal computer, tablet, mobile device, or the like.

System Architecture for Roles Assigned to Computing Nodes of the Network

Figure 2:
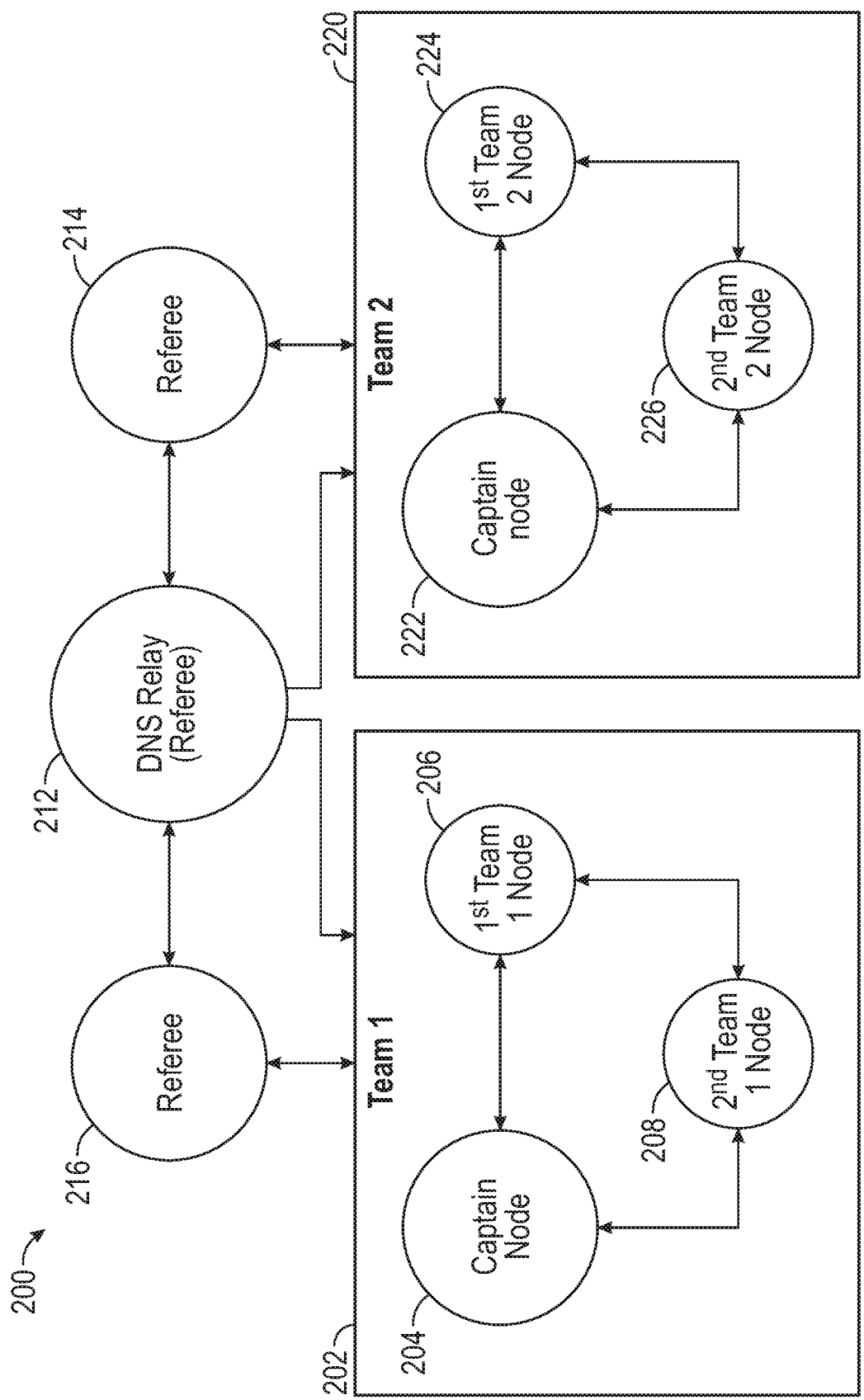
FIG. 2 is a block diagram illustrating system architecture for roles assigned to computing nodes of the network according to some embodiments of the present disclosure.

FIG. 2 is a block diagram illustrating system architecture for roles assigned to computing nodes of the network according to some embodiments of the present disclosure. The system architecture 200 can include a referee node 216 for Team 1 202, a referee node 214 for Team 2 220, a domain name system ("DNS") relay 212 (which can also be a referee node), Team 1 202, and Team 2 220. Team 1 202 can include a captain node 204, a first Team 1 node 206, and a second Team 1 node 208. Team 2 220 can include captain node 222, a first Team 2 node 224, and a second Team 2 node 226. In some embodiments, the referee nodes 214 and 216 can be external to a team or assigned to a team.

In some embodiments, the network is partitioned into teams, such as Team 1 202 and Team 2 220. The teams can be scalable or the size of the teams can vary.

The teams, such as teams 202, 220, can be managed by referee nodes, such as referee nodes 216, 214, respectively. For example, for every 25 nodes on a team, a referee can be assigned to manage the 25 nodes. In some embodiments, a team can be managed by one or more referee nodes. In some embodiments, referee nodes can be assigned based on geography, such as political geography.

The referee nodes 216, 214 can keep track of the number of nodes on each team or the assigned team. The referee nodes 216, 214 can keep track of the geolocations of the nodes on each team or the assigned team. The referee nodes 216, 214 can assign new nodes or remove existing nodes on a team, such as depending on the needs of the team. The referee nodes 216, 214 can manage the data processed by the team nodes assigned to the team that the referee nodes 216, 214 manages, such as ensuring that the data processed by each team node is correct or lock smart contracts that may indicate malicious behavior by a network-selected cyber security organization.

The team nodes, such as the first Team 1 node 206, the second Team 1 node 208, first Team 2 node 224, and a second Team 2 node 226, can request to perform computations of the network by connecting to a referee node, such as the referee nodes 216, 214. The team nodes can process data, transactions, smart contracts, or the like.

In some embodiments, the best performing node of a team can be assigned to be the captain node 204, 222. The captain node 204, 222 can generate the block hash or perform computations of the team nodes.

The DNS relay 212 can direct incoming traffic to a particular team node or receive requests from a requestor node to join a team. In some embodiments, the DNS relay 212 can be assigned as a referee node. The DNS relay 212 can direct traffic to a team's captain that has the smart contract or ledge the client may be looking for. The captain node 204, 222 can redirect the traffic to another node, such as a team node, to execute the smart contract or ledge. In some embodiments, if the DNS relay 212 is the originating node for the request, the request can be redirected to another node.

Assignment of New Nodes to a Team

Figure 3:
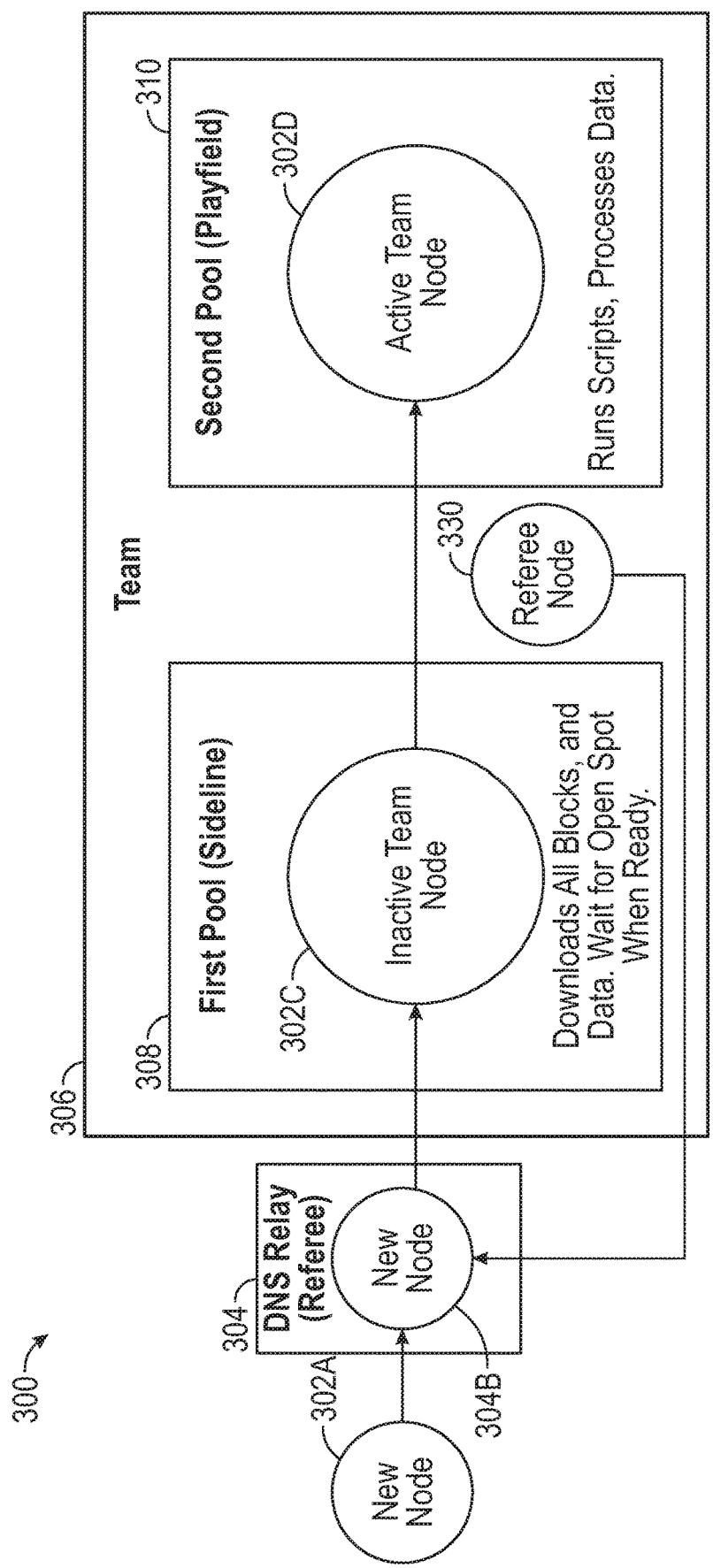
FIG. 3 is a block diagram illustrating the assignment of new nodes to a team according to some embodiments of the present disclosure.

FIG. 3 is a block diagram illustrating the assignment of new nodes to a team according to some embodiments of the present disclosure. The block diagram 300 can include a new node 302A, 302B, 302C, 302D, a DNS relay 304, and a team 306. The team 306 can include a first pool 308, such as a sideline, and a second pool 310, such as a playfield. The first pool 308 and the first pool 310 can include nodes assigned to it.

The team 306 can be partitioned into various pools, such as a first pool 308, such as a sideline, and a second pool 310, such as a playfield, where pools can or cannot perform certain actions. For example, the new node 302A can request to join a team to the DNS relay 304. The DNS relay 304 can send an assignment for the new node 302B to join the first pool 308. In some embodiments, the DNS relay 304 can assign the new node 302C to a team based on geolocation, such as the geolocation close to one or more other nodes of that team.

In some embodiments, when the new node 302C is assigned to the first pool 308, the new node can become inactive. In some embodiments, the new node 302C is assigned to the first pool 308, the new node 302C can perform a limited set of computations, cannot perform computations, or can perform all computations. For example, the new node 302C can download and verify all blocks and data of the blockchain but cannot run scripts or process data of the blockchain.

In some embodiments, the referee node 330 can communicate with the inactive new node 302C and retrieve data related to the inactive new node 302C, such as geolocation, latency, other performance metrics, or the like. In some embodiments, the referee node 330 can collect data related to the nodes of one or more pools within the team 306.

Based on the received data, the referee node 330 can move team nodes within pools of the team. For example, based on the received geolocation, latency, or other performance metrics of the new node 302C, the referee node 330 can move the new node 302D to the second pool 310. The new node 302D in the second pool 310 can have access to different computational scripts. For example, the new node 302D can run scripts and process data for the blockchain that was unavailable in the first pool 308.

In some embodiments, the referee node 330 can move team nodes based on certain parameters. For example, referee node 330 can move team nodes based on best uptime, best latency, most scripts executed, types of scripts executed, or the like. In some embodiments, the referee node 330 can move the top performing nodes to the second pool, such as the playfield, and the lowest performing nodes to the first pool, such as the sidelines.

Decision Process for Assigning a New Node to Perform Blockchain Computations

Figure 4:
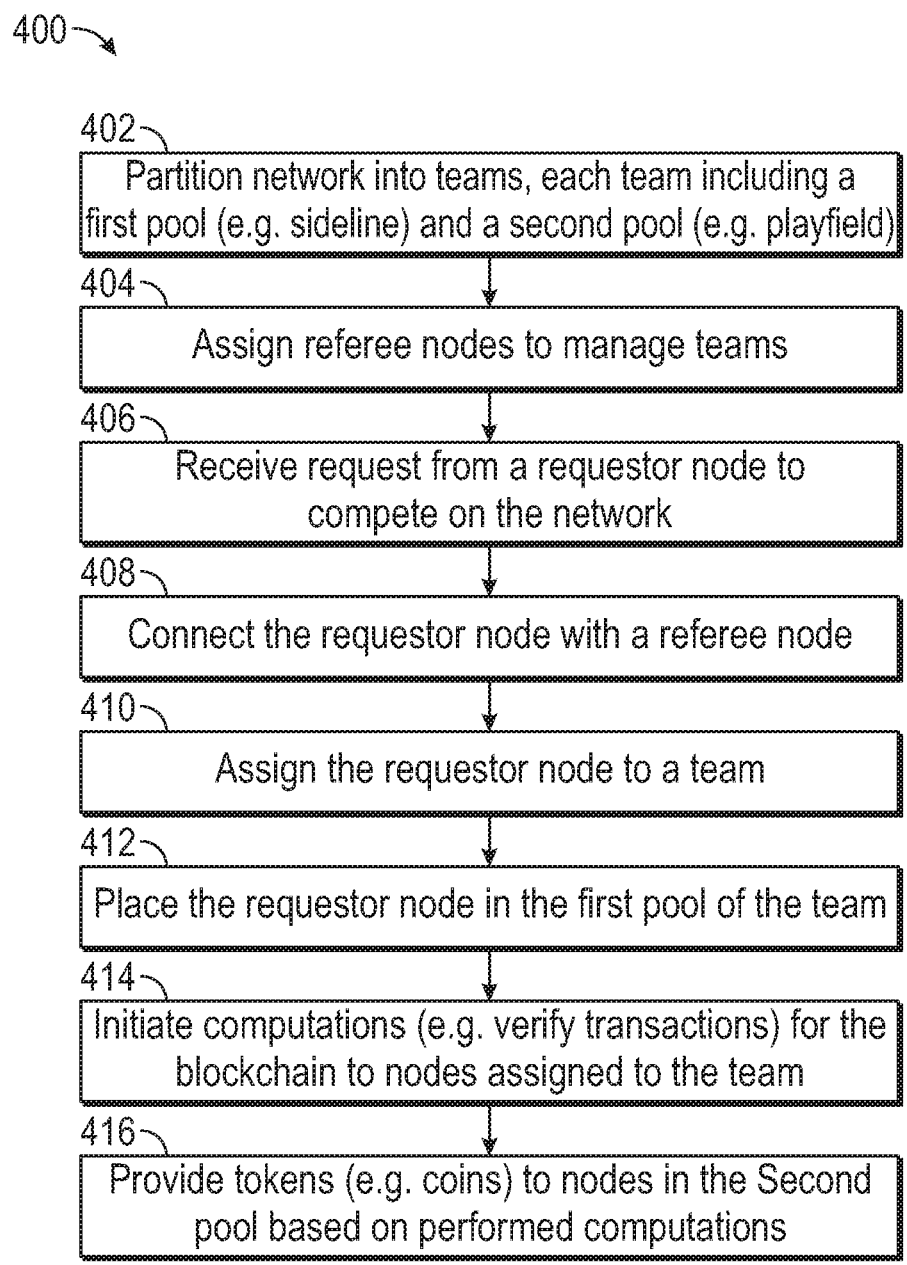
FIG. 4 is a flow chart illustrating a process for assigning a new node to perform performing blockchain computations according to some embodiments of the present disclosure.

FIG. 4 is a flow chart illustrating a process 400 for assigning a new node to perform blockchain computations according to some embodiments of the present disclosure. The process 400 can be implemented by a referee node or other node of the team in the network.

The process 400 begins in block 402, where the network is partitioned into teams. The teams can include pools. In the example of FIG. 4, the team includes a first pool, such as a sideline, and a second pool, such as a playfield.

In block 404, the teams can be assigned a referee node to manage nodes on the teams. In some embodiments, a referee node can be assigned based on a vote. For example, nodes on the team can vote for the referee node to manage activities on the node. Assignment of a node can be based on certain circumstances, such as ability to route traffic, processing power and speed, availability, or the like. In some embodiments, nodes of the team can vote out a referee. In some embodiments, certain nodes, such as verified nodes, can outvote the collective vote of all nodes of the team or have different weightings associated to their vote.

In block 406, a node on a team or a referee node can receive a request from a requestor node to compete on the network. In some embodiments, a requestor node can be required to perform a background screening process, request a background screening process, or provide results of a background screening process. For example, the requestor node can contact a selected background screening service, and receive verification of the background screening. The background screening service can include verification of residence for the user, data related to convicted crimes, verification from other nodes, such as from other verified nodes, or the like. If a node provides verification and the verification becomes compromised, the blockchain, such as a referee node, can discard of the compromised verification or generate new verification. In some embodiments, a request for verification or submission of the verification may require a payment of blockchain tokens for the referee node or other node generating the verification. In some embodiments, some or all nodes of a team are required to be verified to join the team.

In block 408, the requestor node can be connected with a referee node. The referee node can help manage the network and ensure the network is performing fairly. The referee node can facilitate the creation of new teams, route network traffic, and assign/reassign nodes to a node. Referee nodes can be controlled by an input of a user or automatically. Referees can be selected by the network via voting or reassigned via voting. Referee nodes can become DNS relays.

In block 410, the requestor node can be assigned to a team, and in block 412, the requestor node can be placed in the first pool, such as a sideline, of the assigned team. In some embodiments, all new nodes are assigned to a particular pool, such as the first pool (sideline). While on the sideline, the new node can download blocks for the team, verify the blocks, or wait to be added to the second pool, such as the playfield.

In block 414, the nodes of the team, such as nodes assigned to both the first and second pool, can perform computations of the blockchain, such as verifying transactions for the blockchain. The transactions can include an action to be performed for an account holder. For example, the account holder can request a message using a private key detailing the action the account holder would like to perform. The request for action can be sent to a team's referee node associated with the account.

The captain can place the request on a merkle tree or other list that includes objects or hashes that describe actions occurred within the block. Captain nodes can create new blocks for the blockchain. The captain node or other node can determine whether the requested action can be placed on the merkle tree. The referee or the captain node can relay the request to other nodes of the team, and the other nodes of the team can build the merkle tree according to the request received from the referee or captain node.

While the action is being confirmed by the nodes of the team, the account can be locked or cannot send any more requests for transactions or actions until the nodes of the team verify the transaction or action. Once the nodes of the team verify or process the transaction or action, the account can be unlocked.

In some embodiments, the transaction can include transferring tokens, such as objects or coins of the blockchain, to another account. The transaction can be to subtract an amount of tokens from one account and add the amount of tokens to another account. The ledger can indicate that the tokens were subtracted from one account and added to another account.

The ledger can include an option where tokens are immediately removed from the sending account, then sent in portions at a later time. Multiple hashes that represent the portion transactions can be requested at later varying times. Advantageously, the transaction can include an additional layer of transactional anonymity.

Nodes on a team can keep track of the total number of tokens currently on the network or assigned to the team. As coins are subtracted and added based on each transaction, the total coin for the network or for each team can be updated. Referee nodes can continually share the latest coin count changes amongst each other, or pass these changes to other nodes.

An account can include a token wallet. An account can be created by a node or processor using an input from a user. In some embodiments, users trying to create the account can be requested or required to verify a series of transactions and blocks, or pay to create an account, such as in the amount of tokens. The token payment can be distributed to nodes within the team or pools within the team. Accounts can be assigned to a particular team and not to the entire network. Accounts can hold an amount of tokens or be able to transfer tokens to other accounts on the same or different teams. Each account can be associated with a public key and a private key. Accounts can include an email with the username, a team name, or a token symbol. For example, an account address can be: nathan@team10.xrj.

An example format can be:

[Account name]@team[number].[token symbol]

Tokens or objects of the blockchain can be sent or received from the wallet. For example, game objects or real estate objects can be transferred from one person to another. An example of a real estate transfer can be: nathan@team10.object→house. Advantageously, objects can be securely transferred via a smart contract or a development application securely.

An example format can be:

[Account name]@team[number].object→[object symbol]

A url encoded query string can be appended to the end of the account as the transaction destination. Two examples of such a URL encoded query string can be:

nathan@team10.object→house?id=19&name=Cool+ house nathan@team10.xrj?message=Hi+there+guy In block 416, nodes in the second pool can be provided tokens, such as blockchain coins, based on the performed computations. Nodes assigned to the second pool, such as the playfield, can earn tokens, such as coins, and can be added to transactions to the blockchain. In some embodiments, nodes of the first pool may not earn coins but can perform computations to verify transactions.

In some embodiments, the blockchain network or a particular team can generate a certain number of tokens per time interval. For example, 1.65 tokens can be generated per hour. If there are 200 teams with 100 nodes and 4 referees for each team, approximately 2,890,800 tokens can be generated per year.

An non-limiting example of a mining payout can include:
 0.1 Tokens to the Captain
 0.5 Tokens split between each node on the team 0.1 Tokens to the developers 0.1 Tokens to each DNS relay on the team 0.05 Tokens to a pool for DDOS protection services 0.1 Tokens to a pool for bug bounties and security vulnerabilities 0.1 Tokens to a pool for the network's legal representatives 0.1 Tokens split evenly amongst the background screening providers 0.1 Tokens split evenly amongst the cyber security organizations 0.1 Tokens to each referee on the team to help maintain the network The tokens created on the network can remain only on that team. The symbol associated with the token can be distributed among the referee nodes, such that traffic can be routed between teams. Token symbols and object symbols can be reserved for a fee of a certain number of tokens per time period, such as 0.01 tokens per year. Tokens can be used on run transactions on the network, such as 0.00001 tokens per hour. For every certain number of transactions per hour, the token fee can include a multiplier. For example:

Hour 1: 30,000 tx/h-0.00001 tokens/h

Hour 2: 40,000 tx/h-0.00002 tokens/h

Hour 3: 40,000 tx/h-0.00002 tokens/h

Hour 4: 70,000 tx/h-0.00002 tokens/h

Hour 5: 80,000 tx/h-0.00003 tokens/h

Hour 6: 90,000 tx/h-0.00003 tokens/h

Hour 7: 120,000 tx/h-0.00004 tokens/h

Decision Process for Assigning Nodes Between a First and Second Pool of Nodes

Figure 5:
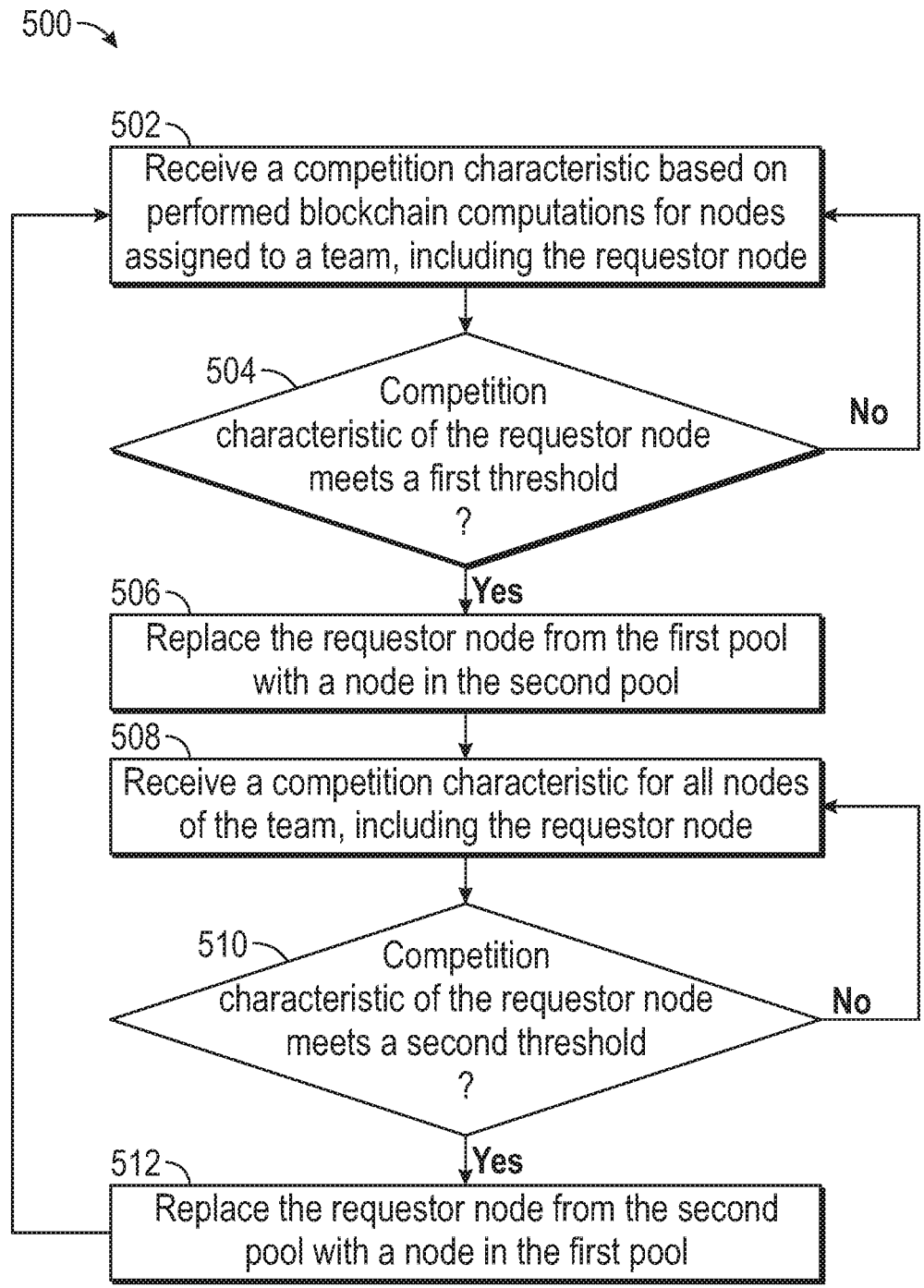
FIG. 5 is a flow chart illustrating a process for assigning nodes between a first and second pool of nodes according to some embodiments of the present disclosure.

FIG. 5 is a flow chart illustrating a process 500 for assigning nodes between a first and second pool of nodes according to some embodiments of the present disclosure. The process 500 can be implemented by a referee node or other node of the team in the network.

In block 502, the referee node or other node can receive a characteristic, such as a competition characteristic, for one or more nodes in the team. The competition characteristic can be based on performed blockchain computations for nodes assigned to the team.

The competition characteristic can include geographic location. For example, a competition characteristic can include the distance between the node and other nodes, such as a referee node, based on a ping signal sent to and from the referee node and the node associated with the competition characteristic. In some embodiments, average ping times are determined. Advantageously, a node with better latency or geolocation can be selected.

In some embodiments, an average of a plurality of nodes can be determined. For example, a single user can control a plurality of nodes. The best latency or average latency can be determined.

In some embodiments, a ping can be determined which can include ping messages sent from the node associated with the competition characteristic and other nodes in the same team.

In some embodiments, a node can include sub-nodes. Sub-nodes can be placed in different geolocations of each other. Referees can identify sub-nodes of a node and determine average or best latency times for the sub-nodes. The referee node can determine average or best latency times between the sub-nodes.

In some embodiments, competition characteristics of certain nodes can be multiplied by a weighting factor. For example, a weighting factor of 5 can be applied to verified nodes. A weighting factor can be applied based on the node's latency. A weighting factor can be applied based on the connectivity or disconnection frequency of the node from the network. A weighting factor can be applied to a number of executed scripts, transactions, or actions on the blockchain.

In block 504, if the competition characteristic of the requestor node meets a certain threshold, in block 506, the requestor node can be assigned from the first pool. The requestor node of the first pool can be replaced or swapped with a node in the second pool. If the competition characteristic of the requestor node does not meet a certain threshold, the process can continue to block 502.

In block 508, the referee node or other node can receive a characteristic, such as a competition characteristic, for one or more nodes in the team. In block 510, if the competition characteristic of the requestor node meets a second threshold, in block 512, the requestor node of the second pool can be replaced or swapped with a node in the first pool. If the competition characteristic of the requestor node does not meet the second threshold, the process can continue to block 508.

In some embodiments, the first or second threshold can be a set predetermined value, such as a latency value. In some embodiments, the first or second threshold can be a dynamic value. The first or second threshold can be determined based on the performance characteristics of one or more nodes on the team. For example, the top 5 nodes can be swapped from the first pool to the second pool. The first or second threshold can be a percentage of the total number of nodes on the team, in the first pool, or in the second pool.

In some embodiments, block 504 or block 512 can be performed after a certain number of transactions, actions, or scripts are submitted to the team. As such, after a certain number of transactions are verified, the best performing nodes in the first pool can be moved to the second pool, and the worst performing nodes in the second pool can be moved to the first pool. In some embodiments, the best performing nodes of the entire team can be assigned to the second pool, or the worst performing nodes can be assigned to the first pool. As such, the better performing nodes can receive tokens or improve the token amount received for performing blockchain computations.

Decision Process for Generating a Block Hash for the Blockchain

Figure 6:
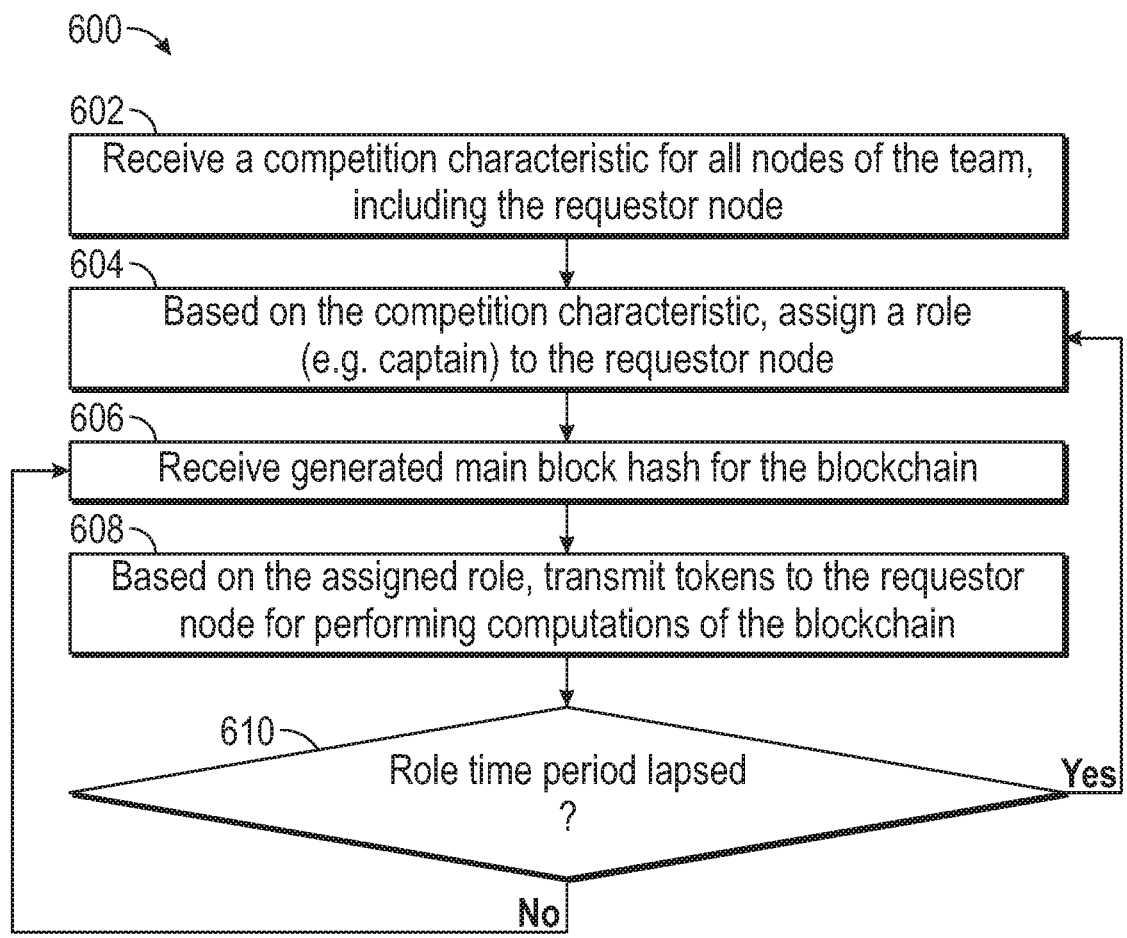
FIG. 6 is a flow chart illustrating a process for generating a block hash for the blockchain using a captain node according to some embodiments of the present disclosure.

FIG. 6 is a flow chart illustrating a process 600 for generating a block hash for the blockchain using a captain node according to some embodiments of the present disclosure. The process 600 can be implemented by a referee node or other node of the team in the network.

In block 602, a referee node or other node can receive a competition characteristic for one or more nodes on the team, including from the requestor node.

In block 604, the referee node can assign a node as the captain node. For example, the assignment can be based on the competition characteristic. The referee node can assign the best performing node as the captain node. In some embodiments, nodes compete to become the team captain node.

In block 606, the referee node can receive the generated the main block hash for the blockchain from the requestor node that was assigned the captain node. The captain node can generate the block hash. The main block hash can be based on all validated data from the merkle tree or can pass the block hash to other nodes on the team to verify the block hash. As transaction requests are received, the captain node or other node can distribute the requests to other nodes on the team and inform the other nodes where to place the transaction object on the merkle tree.

In block 608, based on the assigned role, the referee node or other node can transmit tokens to the requestor node for performing computations of the blockchain. In some embodiments, the captain node can be assigned for a certain period of time. In block 610, if a time period elapses, the referee node returns to block 604 and assigns a captain node again based on the competition characteristic. In block 610, if the time period did not elapse, the process continues to block 606.

Decision Process for Repartitioning Nodes of a Team into a Plurality of Teams

Figure 7:
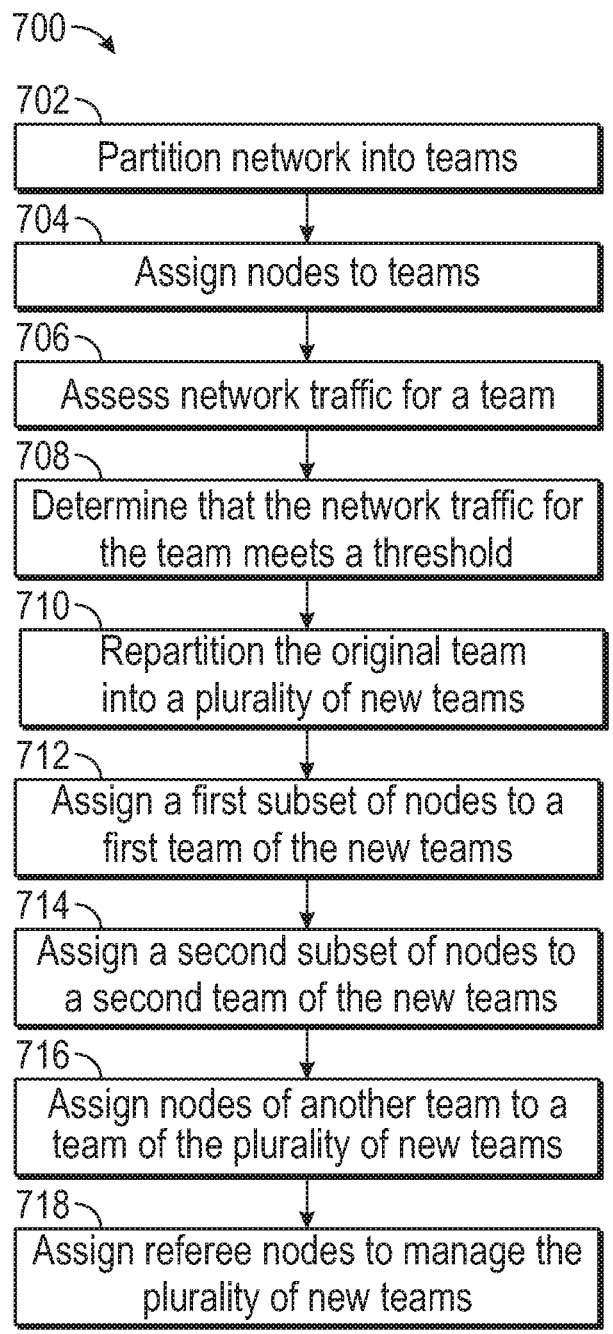
FIG. 7 is a flow chart illustrating a process for repartitioning nodes of a team into a plurality of teams according to some embodiments of the present disclosure.

FIG. 7 is a flow chart illustrating a process 700 for repartitioning nodes of a team into a plurality of teams according to some embodiments of the present disclosure. The process 700 can be implemented by a referee node or other node of the team in the network.

In some embodiments, one or more referee nodes can keep track of the number of nodes on each of their respective teams along with the number of scripts currently executing previously executed, to be executed, or the like. In some embodiments, once the maximum number of scripts are being executed on each team, referee nodes can verify the number of scripts with each other, and create a new team.

In block 702, the network is partitioned into one or more teams. For example, the network can be partitioned into a first and second team.

In block 704, certain nodes are assigned to the partitioned one or more teams. The requestor node can be assigned to the first team. The role of a referee node or captain node can be assigned to each team. In some embodiments, a temporary referee is assigned. The referee node can be assigned based on ratings of the nodes or history of assignments such as the node that has been assigned a referee node the longest. In some embodiments, a referee node can exist on two teams simultaneously, such as the first and second team. Once a permanent or non-temporary referee is selected for that team, the temporary referee can be reassigned to its original team.

In block 706, a referee node or other node of the network assesses the network traffic for one or more teams. In block 708, the referee node or other node can determine that the network traffic for a team meets a certain threshold. For example, the threshold can be based on the number of nodes on the network, the total computations or communications between the nodes, based on a technical characteristic of a node such as processing speed or memory, based relative to network traffic of other teams, pools, or nodes, or the like.

In block 710 in response to determining that the network traffic for the team meets a threshold, the team can be repartitioned into a plurality of new teams. The plurality of new teams can include the original team and a new team or a plurality of new teams while discarding the original team. For example, the plurality of new teams can include a first team and a second team.

In block 712, a first subset of nodes from the original team can be assigned to a first team of the plurality of new teams. In block 714, a second subset of nodes from the original team can be assigned to a second team of the plurality of new teams.

In block 716, nodes of another team can be added to the new teams. For example, if the second team has insufficient nodes to perform the computations required by the team, nodes of another team can be added to the second team to supplement computational power.

In block 718, referee nodes can be assigned to manage the plurality of new teams. In some embodiments, at least one referee node is assigned to each team of the plurality of new teams.

Figure 8:
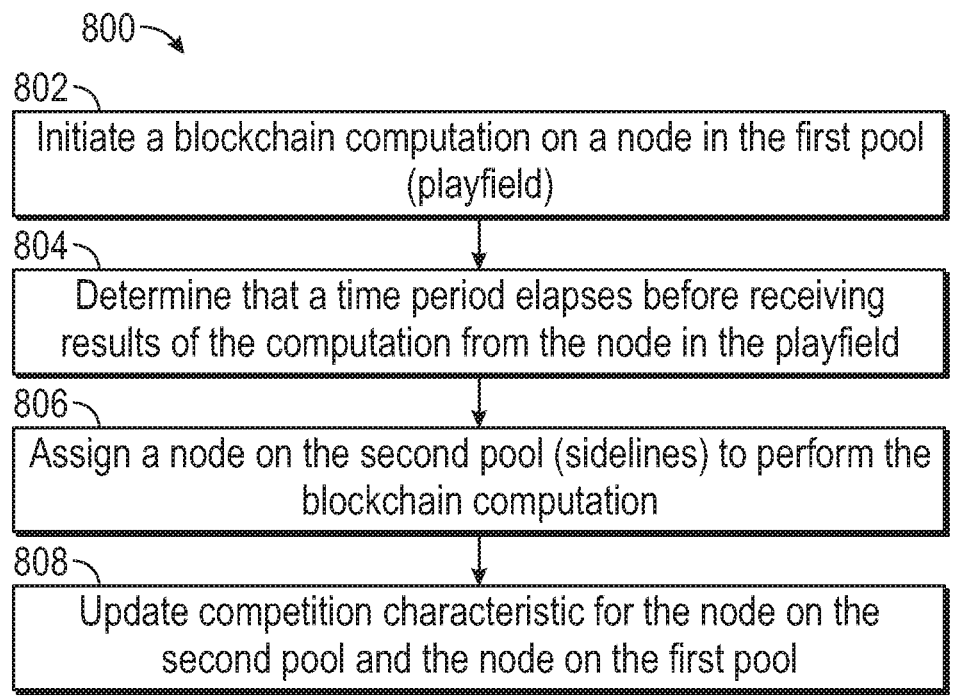
FIG. 8 is a flow chart illustrating a process for assigning a node of the second pool for a blockchain computation initially assigned to a node of the first pool according to some embodiments of the present disclosure.

Decision Process for Assigning a Node of the Second Pool for a Blockchain Computation Initially Assigned to a Node of the First Pool FIG. 8 is a flow chart illustrating a process 800 for assigning a node of the second pool for a blockchain computation initially assigned to a node of the first pool according to some embodiments of the present disclosure. The process 800 can be implemented by a referee node or other node of the team in the network.

In block 802, computations of a blockchain can be initiated on one or more nodes in a first pool, such as the playfield. In block 804, a referee node or other node can determine that a time period elapsed before receiving results of the computation from a node in the playfield. In some embodiments, the time period can be applied to a completion of computation, an intermediate computation of the script, a response of receiving instructions to perform certain computations of the blockchain, or the like. In some embodiments, the time period can be a predetermined amount, such as within 300 ms, or can be dynamic such as being relative to average computational times, computational times of other nodes, or the like.

In block 806, a node in another pool, such as the sideline, can be assigned to perform the blockchain computation. In block 808, a competition characteristic can be updated for the node in the second pool performing the computation and for the unresponsive node in the first pool. As such, if a node on the playfield is taking too much time to respond, nodes on the sidelines can verify the transaction instead, increasing their chances of joining the playfield, while decreasing the chance of the unresponsive node to remain on the playfield.

Decision Process for Initiating a Blockchain Computation Across Multiple Teams

Figure 9:
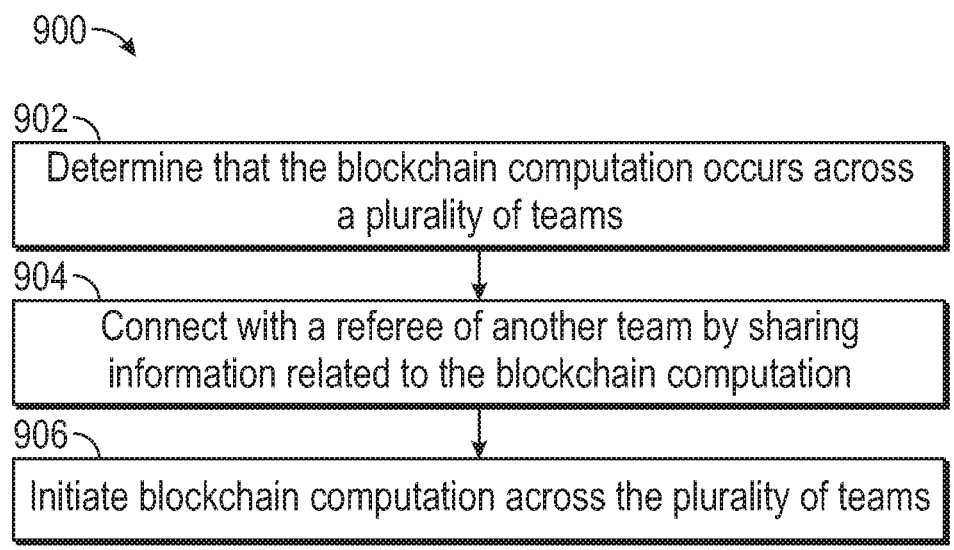
FIG. 9 is a flow chart illustrating a process for initiating a blockchain computation across multiple teams according to some embodiments of the present disclosure.

FIG. 9 is a flow chart illustrating a process 900 for initiating a blockchain computation across multiple teams according to some embodiments of the present disclosure. The process 900 can be implemented by a referee node or other node of the team in the network.

In block 902, a referee node or other node can determine that a blockchain computation occurs across a plurality of teams. For example, a transaction can occur between accounts on different teams. In block 904, the referee node can contact a referee node of another team and share information to facilitate the transaction between the teams. In block 906, the blockchain computation can be initiated across the plurality of teams. For example, the referee nodes can share the IP addresses of the nodes on the respective teams, and the nodes can connect to each other verifying the transaction.

Block Diagram for Nodes on a First and Second Team

Figure 10:
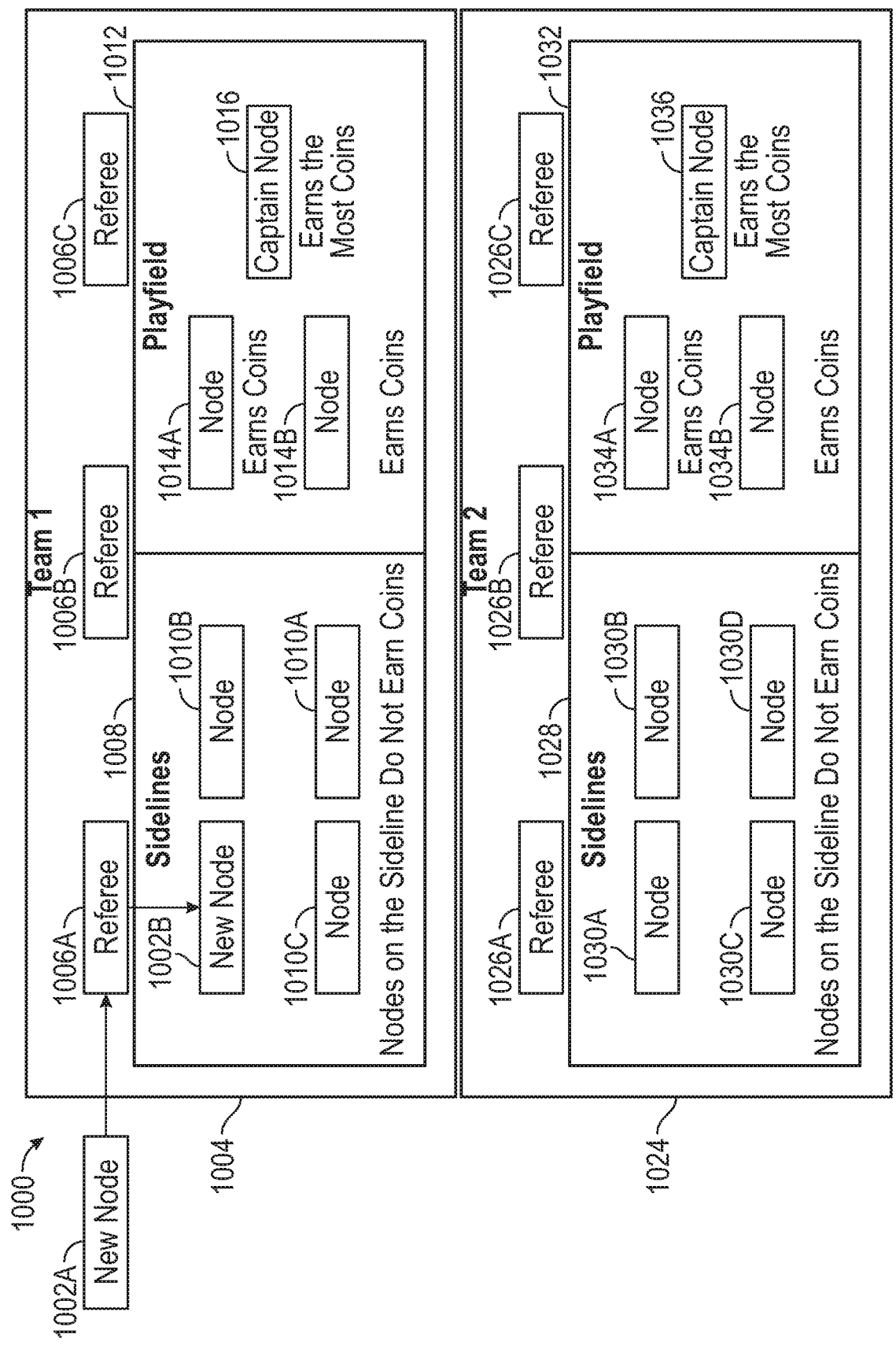
FIG. 10 is a block diagram illustrating nodes across two teams according to some embodiments of the present disclosure.

FIG. 10 is a block 1000 diagram illustrating nodes across two teams according to some embodiments of the present disclosure. The network can include a new node 1002 attempting to enter the network, Team 1 1004, and Team 2 1024. Team 1 1004 can include a sideline 1008, such as a first pool, a playfield 1012, such as a second pool, a referee node 1006A for the sidelines 1008, a referee node 1006C for the playfield 1012, and a referee node 1006B as a DNS relay. The sidelines 1008 can include the new node 1002A after being assigned to the sidelines 1008, and other nodes such as Node 1010A, 1010B, 1010C. The playfield 1012 can include nodes such as 1014A, 1014B, and a captain node 1016.

Team 2 1024 can include a sideline 1028, such as a first pool, a playfield 1032, such as a second pool, a referee node 1026A for the sidelines 1028, a referee node 1026C for the playfield 1032, and a referee node 1026B as a DNS relay. The sidelines 1028 can include nodes such as Node 1030A, 1030B, 1030C, 1030D. The playfield 1032 can include nodes such as 1034A, 10348, and a captain node 1036.

In the example of FIG. 10, the new node 1002 is assigned to the sidelines 1008 of Team 1 1004 by the referee node 1006A that manages activities for the sidelines 1008 of Team 1 1004. The nodes in the sidelines may not earn tokens (such as blockchain coins) for performing computations or verifying transactions of the blockchain. The nodes in the playfield can earn coins, where the captain node can earn the most coins. In some embodiments, nodes in the sidelines may not perform any computations or a limited set of computations of the blockchain. In some embodiments, nodes in the sidelines can earn less coins than nodes in the playfield.

Block Diagram for Processing a Smart Contract Using the Blockchain

Figure 11:
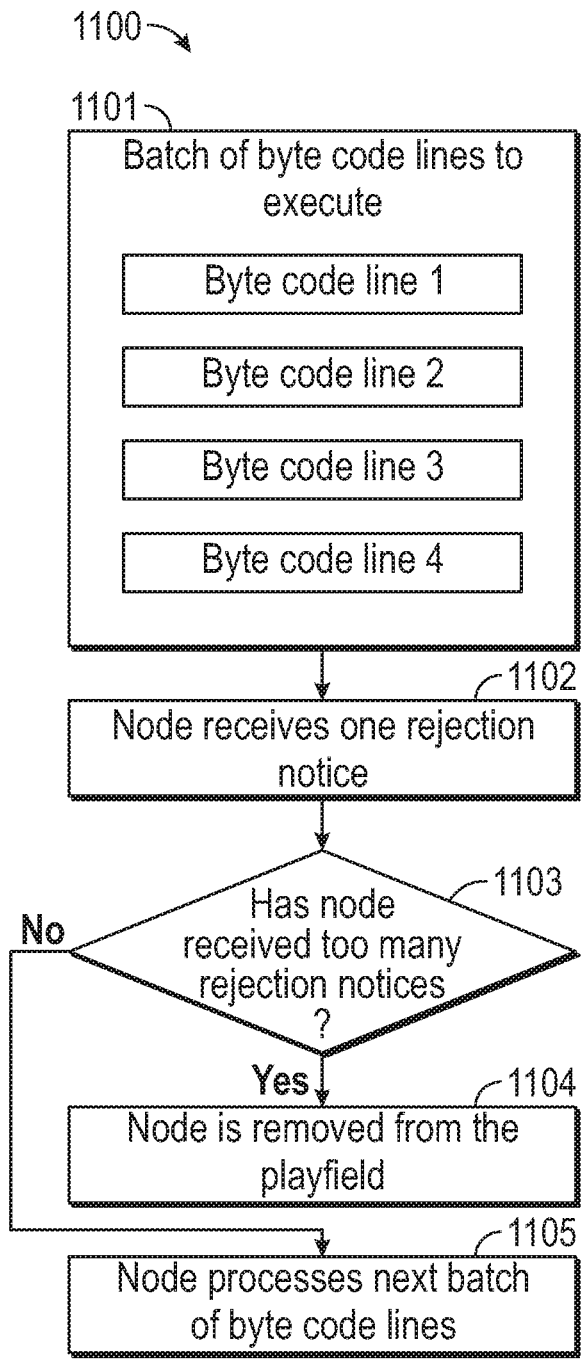
FIG. 11 is a flow chart illustrating a process for processing a smart contract using the blockchain according to some embodiments of the present disclosure.

FIG. 11 is a flow chart illustrating a process 1100 for processing a smart contract using the blockchain according to some embodiments of the present disclosure. The process 1100 can be implemented by a referee node or other node of the team in the network. An application that runs on the blockchain, such as a script, can either be a development application (Dapp), a smart contract, or the like. FIG. 11 illustrates a decision process for smart contracts on a blockchain according to some embodiments.

A smart contract can be executed by one or more nodes of the blockchain. In some embodiments, every node on a team can execute a smart contract. Every node on the team can receive a batch of byte code lines to execute.

In block 1101, byte code lines can be generated, such as Byte code line 1, 2, 3, and 4 generated by the referee node. After a certain number of byte code lines are received, the byte code lines can be combined to generate a hash and distributed to other nodes on the team, such as the nearest nodes of the same team as the referee node.

In block 1102, the nodes on the team can determined whether the generated byte code hashes are correct. If the generated byte code are correct, the next batch of byte code lines can be processed in block 1106.

If in block 1102 the hash for the generated byte code is not correct, in block 1103, the referee node receives one rejection notice. For example, for each node that identifies that the hash for the generated byte code is not correct, the referee node receives a rejection notice from each node.

In block 1104, the referee node determines whether too many rejection notices were received. In block 1104 if too many rejection notices were received, in block 1105 the node is removed from the playfield, such as the node generating the byte code hash. In block 1104 if too many rejection notices were not received, in block 1106 the node processes the next batch of byte code lines.

Network Rules

In some embodiments, the nodes of each team can be required to abide by network rules. For example, the nodes may be required to abide by network rules for smart contracts, for development applications, server applications, or the like, such as:

Do not knowingly participate in the proliferation of sexual content involving those under the age of 18.

Do not knowingly participate in the slave trade of human beings.

Do not knowingly participate in murder for hire services.

Do not knowingly participate in theft of any kind.

Do not participate in attacking the blockchain network, any other device, or network. With an exception being that the target has requested to be attacked.

If a smart contract, development application, or server application being hosted by the blockchain network is found to be breaking any of these rules, evidence can be collected by network selected cyber security organizations to be reviewed by a referee node or an additional cyber security organization. Based on the review, a locking process can begin, as described in further detail below.

Background Screening Providers

In some embodiments, background screening providers can verify that the individual applying for the network to become a verified node. The background screening providers can verify an individual's identity, criminal record, conduct phone or video interviews, request public key signing, verify the country of residence, or the like. If the country where the requesting node resides has restrictions for the network, the verification process can be altered, such as requiring more information, or denied.

Once the background screening provider has verified the identity of the individual, the profile for the associated node can reflect the verified status or can store verification data. For example, basic personal information of the individual, such as first name, last name, and current address can be saved and encrypted to be stored on the background screen providers computers. Alternatively or in conjunction, the data can be stored on an external memory device to the node.

Legal Requests

In some embodiments, nodes can submit a legal request for nodes of the network to vote on. For example, a legal request may require a certain number of verified nodes, and the selected law firm can receive payment from the team or network.

A selected law firm can be hired by the network to represent one or more nodes of the network. For example, if the network were to come under attack from a group of hackers, the network selected cyber security organization can attempt to find them. If they caught, the network could hire a legal team within that country to press charges against them. Or, if some unjust regulations were trying to be passed somewhere in the world, lawyers or lobbyists within those countries could be hired to help prevent those regulations from passing. Legal packages for initial coin offerings (ICOs) could be drafted for each country people wish to host their ICO in.

Network Security and Debugging

In some embodiments, network selected cyber security organizations can help prevent hackers from attacking the network or present evidence to referees to stop malicious activities from taking place on the network.

In the event of a network or team attack, a cyber security organization can issue a warning to one or more nodes of the network. In the circumstance that the cyber attack is successful, the cyber security organization can present evidence to the network for referees to review. In some embodiments, a certain number of referee nodes may be required to review and approve the evidence such as to perform certain corrective measures on the blockchain, such as reverse certain actions, temporarily suspend certain activities of a team, or the like.

In some embodiments, referee nodes can lock accounts, nodes, smart contracts, development applications or the like. Such locking can occur based on evidence submitted by, received from, or verified by a network selected cyber security organization. Locked accounts can be reviewed or appealed, such as by a plurality of referee nodes.

In some embodiments, a bug bounty can be in place for one or more nodes of the network. A submission of a bug or security vulnerability by a node of a network can be assessed by one or more other nodes. Based on the value of the bug, security vulnerability, or solutions thereto can determine a token payment amount for the node.

In some embodiments, smart contracts or development applications can be submitted as a debug or release script. A debug script can include a public key to allow nodes of the team to debug the application in real time as the script is executing on the nodes.

Network Upgrades

In some embodiments, the nodes of the blockchain can include similar or the same code across all nodes in the blockchain, across each team, across each pool within a team, or the like. The initial code can be updated based on a consensus of the new code. For example, network upgrade proposals or code can be placed into the blockchain that is stored by one or more nodes. The proposal for network updates can be submitted by any node, verified nodes, or nodes assigned to a particular role of the blockchain. As new network upgrade proposals are introduced, any node, verified nodes, or nodes assigned to a particular role of the blockchain can vote for the network upgrade. In some embodiments, a certain percentage, number, or threshold of nodes may be required to implement the proposal. The decision on whether to implement the network update can depend on various factors, such as a vote count, security, speed, performance, scalability, or the like. In some embodiments, network update proposals can be re-voted after a certain time period passes. Based on the revote, a network update can be delayed.

Other Variations

Those skilled in the art will appreciate that in some embodiments additional system components can be utilized, and disclosed system components can be combined or omitted. Although some embodiments describe video data transmission, disclosed systems and methods can be used for transmission of any type of data. In addition, although some embodiments utilize erasure coding, any suitable error correction schemes can be used. The actual steps taken in the disclosed processes, such as the processes illustrated in FIGS. 2A-2C, may differ from those shown in the figures. Depending on the embodiment, certain of the steps described above may be removed, others may be added. Accordingly, the scope of the present disclosure is intended to be defined only by reference to the appended claims.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the various components illustrated in the figures may be implemented as software or firmware on a processor, ASIC/FPGA, or dedicated hardware having one or more logic circuits. Also, the features and attributes of the specific embodiments disclosed above may be combined in different ways to form additional embodiments, all of which fall within the scope of the present disclosure.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will further be understood that the terms "comprises" or "comprising," when used in this specification, specify the presence of stated features, integers, steps, operations, elements, or components, but do not preclude the presence or addition of one or more other features, integers, steps, operations, elements, components, or groups thereof. Further, references to "a method" or "an embodiment" throughout are not intended to mean the same method or same embodiment, unless the context clearly indicates otherwise.

Conditional language, such as "can," "could," "might," or "may," unless specifically stated otherwise, or otherwise understood within the context as used, is generally intended to convey that certain embodiments include, while other embodiments do not include, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The corresponding structures, materials, acts, and equivalents of all means or step plus function elements in the claims below are intended to include any structure, material, or act for performing the function in combination with other claimed elements as specifically claimed. The description of the various embodiments of the present disclosure has been presented for purposes of illustration and description, but is not intended to be exhaustive or limited to the embodiments disclosed. Many modifications and variations will be apparent to those of ordinary skill in the art without departing from the scope and spirit of this disclosure. The example embodiments were chosen and described in order to best explain the principles of this disclosure and the practical application, and to enable others of ordinary skill in the art to understand this disclosure for various embodiments with various modifications as are suited to the particular use contemplated.

Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. An access control method comprising:
by at least one processor of a first node:
via a network interface, receiving a request packet from a requestor node on an unsecured network to join a first group of nodes, the first node configured to monitor data shared in the first group of nodes comprising a plurality of partitioned nodes of a secured network;
in response to the received request packet, assigning the requestor node to a first pool of the first group of nodes within the secured network using a secured network protocol through the network interface, wherein one or more nodes of the first pool are configured to perform one or more authorized modifications of data, the data comprising a blockchain including at least one cryptographic hash configured to protect the data against unauthorized modifications;
initiating the one or more authorized modifications of the data using one or more nodes assigned to the first pool including the requestor node and one or more nodes of a second pool of the first group of nodes, wherein the one or more nodes of the second pool are different than the one or more nodes of the first pool, and wherein the one or more nodes of the first pool and second pool are configured to perform additional authorized modifications of the data;
determining performance of the requestor node, the performance indicative of a level of protection of data from malicious destruction as a result of at least one authorized modification of the data by the requestor node; and
in response to determining that the performance of the requestor node satisfies a threshold, reassigning the requestor node to the second pool.

2. The method of claim 1, further comprising: by the at least one processor of the first node:
receiving a performance characteristic based on performed modifications of the data for the requestor node assigned to the first pool of the first group of nodes;
determining that the performance characteristic for the requestor node satisfies a first threshold; and
assigning the requestor node from the first pool to the second pool.

3. The method of claim 2, further comprising:
receiving a performance characteristic for subsequent modifications of the data for the requestor node;
determining that the performance characteristic for the requestor node satisfies a second threshold; and
assigning the requestor node from the second pool to the first pool.

4. An access control method comprising:
by at least one processor of a first node:
receiving a request from a requestor node to join a first group of nodes, the first node coordinating network activities of the first group of nodes comprising a plurality of partitioned nodes of a network;
in response to receiving the request, assigning the requestor node to a first pool of the first group of nodes, wherein one or more nodes of the first pool are configured to perform computations for a blockchain without receiving blockchain tokens for the performed computations;
initiating computations for the blockchain using one or more nodes assigned to the first pool and a second pool of the first group of nodes, wherein the second pool includes one or more different nodes than the first pool;
initiating distribution of tokens to the one or more nodes assigned to the second pool of the first group of nodes based on the performed computations for the blockchain;
assessing network traffic for the first group of nodes;
determining that the network traffic for the first group of nodes satisfies a threshold;
in response to determining that the network traffic for the first group of nodes satisfies the threshold, repartitioning the first group of nodes into a first subset of nodes and a second subset of nodes;
assigning the first subset of nodes to the first group of nodes;
assigning the second subset of node to a second group of nodes; and
assigning a node of the second subset of nodes to manage activities for the second group of nodes.

5. The method of claim 4, further comprising: by the at least one processor of the first node:
receiving a performance characteristic based on performed blockchain computations for the requestor node assigned to the first pool of the first group of nodes;
determining that the performance characteristic for the requestor node satisfies a first threshold; and
assigning the requestor node from the first pool to the second pool.

6. The method of claim 5, further comprising:
receiving a performance characteristic for subsequent computations for the blockchain for the requestor node;
determining that the performance characteristic for the requestor node satisfies a second threshold; and
assigning the requestor node from the second pool to the first pool.

7. The method of claim 5, wherein the first threshold is pre-determined.

8. The method of claim 5, wherein the first threshold is based on a performance characteristic of other nodes in the first group of nodes.

9. The method of claim 5, wherein to assign the requestor node from the first pool to the second pool includes replacing a node in the second pool with the requestor node.

10. The method of claim 4, further comprising:
by the at least one processor of the first node:
receiving a performance characteristic for a plurality of nodes of the first group of nodes, including the requestor node, associated with the performed computations for the blockchain; and
based on the received performance characteristic, assigning the requestor node as a block hash node for the first group of nodes, wherein the block hash node is configured to generate a block hash for the blockchain.

11. The method of claim 10, further comprising:
by the at least one processor of the first node:
receiving a generated block hash for the blockchain from the block hash node,
wherein initiating computations for the blockchain include initiating computations for the generated block hash.

12. The method of claim 10, further comprising:
by the at least one processor of the first node:

determining that a predetermined time period elapsed; and in response to determining that the predetermined time period elapsed, assign a different node of the first group of nodes as the block hash node.

13. The method of claim 4, further comprising:
by the at least one processor of the first node:
determining that a predetermined time period elapsed before receiving results of the computation from a node in the second pool;
assigning a node on the first pool to perform the computation for the blockchain; and
updating a performance characteristic for the node in the second pool and the node on the first pool.

14. The method of claim 4, further comprising:
by the at least one processor of the first node:
determining that a computation for the blockchain is to be performed across one or more nodes of the first group of nodes and one or more nodes of a second group of nodes;
connecting with a second node of the second group of nodes coordinating activities of the second group of nodes by sharing information related to the computation for the blockchain; and
initiating the computation for the blockchain across the first and second group of nodes.

15. The method of claim 4, further comprising:
by the at least one processor of the first node:
assigning the first node to a second group of nodes, wherein the first node is configured to manage activities for the first group of nodes and for the second group of nodes.

16. The method of claim 4, wherein the computations for the blockchain include verifying one or more transactions or blocks of the blockchain.

17. An access control system comprising:
a first node including at least one processor and at least one memory storing computer executable instructions that, when performed by the at least one processor, cause the at least one processor to:
receive a request from a requestor node to join a first group of nodes, the first node coordinating network activities of the first group of nodes comprising a plurality of partitioned nodes of a network;
in response to receiving the request, assign the requestor node to a first pool of the first group of nodes, wherein one or more nodes of the first pool are configured to perform computations for a blockchain without receiving blockchain tokens for the performed computations;
initiate computations for the blockchain using one or more nodes assigned to the first pool and a second pool of the first group of nodes, wherein the second pool includes one or more different nodes than the first pool;
initiate distribution of tokens to the one or more nodes assigned to the second pool of the first group of nodes based on the performed computations for the blockchain;
receive a performance characteristic based on performed blockchain computations for the requestor node assigned to the first pool of the first group of nodes;
determine that the performance characteristic for the requestor node satisfies a first threshold; and
assign the requestor node from the first pool to the second pool.

18. The system of claim 17, wherein the at least one processor is further configured to:

receive a performance characteristic for subsequent computations for the blockchain for the requestor node;
determine that the performance characteristic for the requestor node satisfies a second threshold; and
assign the requestor node from the second pool to the first pool.

19. The system of claim 17, wherein the first threshold is pre-determined.

20. The system of claim 17, wherein the first threshold is based on a performance characteristic of other nodes in the first group of nodes.

21. The system of claim 17, wherein the at least one processor is configured to assign the requestor node from the first pool to the second pool by replacing a node in the second pool with the requestor node.

22. An access control method comprising:
by at least one processor of a first node:
receiving a request from a requestor node to join a first group of nodes, the first node coordinating network activities of the first group of nodes comprising a plurality of partitioned nodes of a network;
in response to receiving the request, assigning the requestor node to a first pool of the first group of nodes, wherein one or more nodes of the first pool are configured to perform computations for a blockchain without receiving blockchain tokens for the performed computations;
initiating computations for the blockchain using one or more nodes assigned to the first pool and a second pool of the first group of nodes, wherein the second pool includes one or more different nodes than the first pool;
initiating distribution of tokens to the one or more nodes assigned to the second pool of the first group of nodes based on the performed computations for the blockchain;
determining that a predetermined time period elapsed before receiving results of the computation from a node in the second pool;
assigning a node on the first pool to perform the computation for the blockchain; and
updating a performance characteristic for the node in the second pool and the node on the first pool.

23. The method of claim 22, further comprising: by the at least one processor of the first node:
receiving a performance characteristic based on performed blockchain computations for the requestor node assigned to the first pool of the first group of nodes;
determining that the performance characteristic for the requestor node satisfies a first threshold; and
assigning the requestor node from the first pool to the second pool.

24. The method of claim 22, further comprising:
by the at least one processor of the first node:
receiving a performance characteristic for a plurality of nodes of the first group of nodes, including the requestor node, associated with the performed computations for the blockchain; and
based on the received performance characteristic, assigning the requestor node as a block hash node for the first group of nodes, wherein the block hash node is configured to generate a block hash for the blockchain.

25. The method of claim 22, further comprising:
by the at least one processor of the first node:

determining that a computation for the blockchain is to be performed across one or more nodes of the first group of nodes and one or more nodes of a second group of nodes;

connecting with a second node of the second group of nodes coordinating activities of the second group of nodes by sharing information related to the computation for the blockchain; and initiating the computation for the blockchain across the first and second group of nodes.

26. The method of claim 22, further comprising:

by the at least one processor of the first node:

assigning the first node to a second group of nodes, wherein the first node is configured to manage activities for the first group of nodes and for the second group of nodes.

27. The method of claim 22, wherein the computations for the blockchain include verifying one or more transactions or blocks of the blockchain.

* * * * *